United States Patent Office 2,786,745
Patented Mar. 26, 1957

2,786,745
FUEL OIL

Robert A. Stayner, Berkeley, Richard D. Stayner, Albany, and Ludwig H. Dimpfl, Berkeley, Calif., assignors to California Research Corporation, San Francisco, Calif., a corporation of Delaware No Drawing. Application October 17, 1950, Serial No. 190,650

4 Claims. (Cl. 52—.5)

This invention relates to an improved hydrocarbon fuel, particularly a hydrocarbon fuel suitable for use as a furnace or burner fuel, as a fuel for a compression ignition engine, and as a fuel for use at low temperatures. More specifically, the invention relates to hydrocarbon fuels which are normally characterized by a marked tendency to clog fuel filters by reason of their gum content or water content and which contain an additive that substantially completely eliminates the filter clogging tendencies of the fuels.

As a result of extensive employment of catalytic processes for cracking gas oils in recent years, large volumes of cracked stocks and cycle stocks boiling in the range of 350 to 750° F. have been produced. Stocks of this description are normally utilized in appreciable volumes by incorporating them in furnace oils, burner oils, and diesel fuels. The cracked stocks exhibit a markedly greater tendency to form filterable deposits, such as suspended gum particles, than do straight run stocks. The latter stocks, however, are usually unstable themselves and show appreciable filter clogging tendencies. Suspended gum particles are apparently formed by oxidation and/or polymerization of certain of the components of the cracked stocks on standing. These particles agglomerate and attain such size that they accumulate on filter screens which are ordinarily interposed between the fuel tank and burner or injector pumps and nozzles. Accumulation of these particles on the filter screens gradually plugs them, thereby causing a stoppage of oil flow and requiring that the oil burning apparatus be taken out of service to permit cleaning or replacement of the filter. Water is found present to an appreciable degree in most fuel systems, and its presence in the fuel accelerates the agglomeration of suspended gum particles and the rate at which filters become plugged.

Blending fuels of low and high volatility under field condition to produce a fuel of wider boiling range is a fairly common practice which is commonly attended by aggravated gum formation that gives rise to serious filter clogging problems when it is attempted to utilize the fuel in a combustion system including filtering equipment without further treatment.

Water is commonly present in hydrocarbon fuels as produced and additional water is picked up during storage by "breathing" of storage vessels incident to diurnal temperature variations. Fuels which have been tanked for any appreciable time may be expected to have a water content approximately sufficient to saturate the fuel at storage temperature. In many applications of the fuel such amounts of water are readily tolerated and pose no problem. In certain applications where the fuel is rapidly cooled to sub-freezing temperatures the presence of water causes serious difficulties. For example, fuels for use in jet powered aircraft are rapidly cooled during high altitude flights. The fuel systems of such aircraft include a filter element intermediate the storage tank and fuel nozzles. At low temperatures these filter elements become clogged by accumulations of ice and solid hydrates on the surfaces of the filter element.

Proposals have been made to overcome these difficulties by blanketing the fuel with an inert gas from the time that it leaves the still to the time when it is burned, by adding inhibitors to the fuel which are capable of suppressing the formation of gum particles, or by drying it prior to use. The first of these proposals, while it may be effective, has been found impractical for application to most installations. Only moderate success has been attained along the lines of the second proposal, presumably because of the difficulty of finding an inhibitor which is effective with all of the diverse chemical components of cracked and straight run stocks which contribute to gum formation. The third proposal is impractical under usual field conditions and is in any case a costly solution to the problem.

A further difficulty commonly encountered in connection with the use of burner fuels and diesel fuels is the tendency of these materials to become contaminated with heterogeneous rust particles formed by the action of water and dissolved oxygen on the surface of iron and steel storage tanks. Rust particles are carried by the fuel into the orifices of burner nozzles and injector tips with the result that the apertures of these devices become plugged and require frequent cleaning. The filter clogging problem is further aggravated by the present trend toward smaller bore nozzles which require finer filter screens to prevent nozzle plugging.

It is an object of the present invention to provide a fuel suitable for use in furnaces, burners, compression ignition engines, and in jet-aircraft engines comprising substantial proportions of petroleum stocks normally tending to form gum in filter clogging amounts and/or containing substantial amounts of water and containing minor proportions of an additive hereinafter described which simultaneously prevents agglomeration of suspended gum particles and rusting of ferrous surfaces.

It is a further object of this invention to provide a fuel composition in which the agglomeration of suspended gum particles is substantially completely inhibited in wet fuel systems.

Another object of this invention is to provide a fuel which not only passes through the usual fuel filters without clogging the filter screens on extended runs, but which also is capable of removing and does remove accumulated gummy deposits from a partially clogged filter.

Still another object of the invention is to provide a fuel which may become contaminated with amounts of water and which may be rapidly cooled to sub-freezing temperatures without the formation of filter clogging ice or solid hydrate particles.

It has now been found that by the addition of a small amount of a mixture of predominantly oil-soluble polyoxyalkylene ethers of alkyl phenols to normally liquid hydrocarbon fuels normally having a marked tendency to clog fuel filters, filter clogging can be substantially completely eliminated and that rusting of ferrous metal fuel tanks and lines is simultaneously minimized. The filter clogging tendency is markedly reduced whether it be due to gums at ordinary temperatures or to ice at sub-freezing temperatures. The ether molecules employed in the fuel composition of this invention contain at least 8 carbon atoms in the alkyl group and preferably have an average of 1.5 to 3.0 alkyl groups, each containing 10 to 20 carbon atoms attached to the phenol nucleus; and the polyoxyalkylene portion of the ether molecule may contain from 2 to 40 alkylene oxide molecules, but is preferably formed from 8 to 20 alkylene oxide molecules. Small amounts of certain other materials indicated hereinafter may desirably be added to the fuel to enhance or modify the effect of the polyoxyalkylene ethers.

The preferred oil-soluble polyoxyalkylene ethers of alkyl phenols which are employed in the fuel composition may be prepared by alkylating phenol with an olefin containing at least 8, and preferably 10 to 20, carbon atoms under conditions adapted to produce an alkylation reaction product having an average of at least 1.5 alkyl groups per phenol molecule. The olefins may be straight chain olefins such as those produced in the Fischer-Tropsch synthesis, branched chain olefins such as those obtained by polymerizing propylene and butylene, or mixtures of branched and straight chain olefins such as those which may be separated from a heavy cracked naphtha by selective adsorption with silica gel. Alcohols or alkyl chlorides having carbon chains of suitable length may also be employed as the alkylating agent. The alkyl phenols produced in the alkylation reaction are then condensed preferably with 8 to 20 molecules of an alkylene oxide such as ethylene oxide, propylene oxide, butylene oxide, etc. with ethylene oxide being preferred, to form the desired polyoxyalkylene ether additive. The number of alkylene oxide molecules which are condensed with a particular polyalkyl phenol varies directly with the number of alkyl carbon atoms in the alkyl phenol molecule, being larger when the number of alkyl carbon atoms is large. Also, the number of alkylene oxide molecules is larger when the number of carbon atoms in the alkylene oxide is large. For example, an ether formed by condensing 20 propylene oxide molecules with the alkyl phenol is similar to one formed by condensing 10 to 12 ethylene oxide molecules with the same alkyl phenol. The requirement that the condensation product be substantially oil-soluble imposes an upper limit on the number of alkylene oxide groups which may be condensed with a particular polyalkyl phenol. This maximum is readily ascertained by simple solubility tests. The condensation step need not, however, be rigidly controlled. A suitable additive is obtained by polyalkylating phenol with a wide boiling olefin fraction, condensing the polyalkyl phenol with from about 0.5 to 1.5 times its weight of ethylene oxide and extracting the condensation product with an oil such as kerosene to separate the oil-soluble polyalkylene ether additives.

A suitable method for preparing the polyoxyalkylene additive may be exemplified as follows: 94 grams of phenol were warmed at 45° C. 4.7 grams of gaseous BF₃ were bubbled into the warm phenol and there absorbed, forming a BF₃·phenolate catalyst. 80.7 grams of phenol were added to the catalyst and the mixture was warmed to 60° C. 481 grams of propylene polymer having an average of 12 carbon atoms in the polymer chain were added to the mixture of phenol and catalyst while stirring the mixture. The polymer was added slowly at a rate such that the temperature of the reaction mixture during the addition did not exceed 80° C. When the addition was complete, the reaction mixture was maintained at 80 to 90° C. for a period of four hours, during which the mixture was continuously stirred. At the end of this period 250 milliliters of 5% sodium carbonate were added to the reaction mixture and the resultant mixture was warmed to 85° C. with stirring. The water layer was removed and discarded and the product was washed with two 250 milliliter portions of water at 85 to 95° C. The product was then stripped to remove the last traces of water and a part of the unreacted olefin by heating to 150° C. at 50 mm. pressure. The reaction product was a mixture of alkyl phenols having an average of 2.1 alkyl groups per phenol molecule.

464 grams of the alkyl phenol reaction product mixture and 2.32 grams of flake sodium hydroxide were introduced into a flask equipped with an air cooled reflux condenser, a thermometer, a stirrer, and a gas inlet tube which dipped below the surface of the alkyl phenol mixture. The mixture was warmed to 180° C., flushed with nitrogen to remove air and moisture, and then flushed with ethylene oxide to displace the nitrogen. The reaction vessel was then sealed and 528 grams of ethylene oxide were bubbled into the reaction mixture at a rate such that the pressure was maintained in the range 0.8 to 1.2 atmospheres. The temperature was held below 210° C. during the addition of the ethylene oxide. When the absorption of the ethylene oxide was complete, the reaction vessel was opened and flushed with nitrogen to remove traces of ethylene oxide. The reaction product was a tan colored waxy semi-solid at room temperature. Its composition may be represented by the following formula:

$$(C_{12}H_{25})_{2.1}\phi O(CH_2CH_2O)_{12}H$$

By varying the olefin composition, the olefin-phenol ratio in the alkylation step, and the amount of ethylene oxide condensed with the alkyl phenols in the condensation step, a series of polyoxyalkylene ethers of alkyl phenols were prepared and evaluated as fuel additives. It was found that these materials are highly effective in eliminating filter clogging when they contain from 1.5 to 3.0 alkyl groups, and preferably from 1.8 to 2.2 alkyl groups in the alkyl phenol portion of the ether molecule, and from 8 to 20 and preferably from 10 to 15 alkylene oxide molecules in the polyoxyalkylene portion of the ether molecule.

The evaluation of a large number of polyoxyalkylene ethers of alkyl phenols at a variety of concentrations under actual use conditions requires an enormous outlay of time and material. In order to facilitate the evaluation of various anti-filter clogging additives at ordinary temperatures, a rapid test method was developed which has been found to correlate well with field test determinations of the filter clogging tendency of a petroleum fuel. This test is conducted by mixing 500 cc. of the fuel composition with 500 cc. of water containing 102 parts per million hardness calculated as calcium and magnesium carbonates, two-thirds being calcium carbonate and one-third magnesium carbonate. The fuel and water are shaken for a period of 30 seconds in a separatory funnel and allowed to stand for 10 minutes. On standing, a phase separation occurs producing an upper oil layer and a lower water layer, usually with an opaque cuff appearing at the interface of the two layers. The water layer is usually clear, and most of it is withdrawn. The entire interface cuff is then filtered through a Gooch crucible containing sintered glass, filter paper, or other suitable filter medium. Usually some 25 cc. must be filtered to be assured of getting all the interface cuff to the filter. Agglomerated gummy particles are deposited on the surface of the filter medium, giving it a dark color. The filter is dried and compared with a standard series of 11 filters prepared in similar manner from fuels of known filter clogging tendency. The standard filters are numbered 0 to 10, the higher numbers being identified with the heavier deposits. The particular sample is given an Interface Filter Deposit rating (IFD) which is the number of the filter in the series of 11 with which it compares in respect to the intensity of the deposit. The ratings are made by visual inspection, and it has been found that the effectiveness of an additive to inhibit the filter clogging tendency of a fuel can be rapidly and accurately evaluated in this manner. The following Table I shows the IFD values of a number of polyoxyethylene ethers of alkyl phenols at several levels of concentration. The base fuel employed in each of the evaluations was a 50–50 mixture of a straight run distillate from a waxy base crude which boiled in the range 384 to 675° F. and a fraction boiling in the range 376 to 566° F. separated from the product of a thermofor catalytic cracking process.

TABLE I

*IFD values*

| Test No. | Additive | Amount—Wt. Percent | | | | | |
|---|---|---|---|---|---|---|---|
| | | 0.1 | 0.05 | 0.01 | 0.005 | 0.001 | 0.0005 |
| 1 | $C_8H_{17}\phi O(CH_2CH_2O)H$ | 5 | 7 | 8 | 10 | 10 | 10 |
| 2 | $C_8H_{17}\phi O(CH_2CH_2O)_3H$ | 3 | 4 | 5 | 6 | 7 | 7 |
| 3a | $C_8H_{17}\phi O(CH_2CH_2O)_5H$ | 3.5 | 6.5 | 5 | 7 | 7 | 10 |
| 4 | $C_{12}H_{25}\phi O(CH_2CH_2O)_4H$ | 3 | 5 | 7 | 7 | 7 | 8 |
| 5 | $C_{12}H_{25}\phi O(CH_2CH_2O)_6H$ | 1 | 2 | 2.5 | 4 | 5 | 7 |
| 6 | $C_{12}H_{25}\phi O(CH_2CH_2O)_7H$ | 1 | 3 | 4 | 5 | 6 | 8 |
| 7b | $C_{15}H_{31}\phi O(CH_2CH_2O)_8H$ | 1 | 2 | 3 | 5 | 6 | 9 |
| 8 | $(C_{12}H_{25})_2\phi O(CH_2CH_2O)_{16}H$ | 0 | 1 | 1 | 1.5 | 5 | 6 |
| 9 | $(C_{12}H_{25})_2\phi O(CH_2CH_2O)_{12}H$ | 0 | | 1 | | | |
| 10 | $(C_{12}H_{25})_{2.11}\phi O(CH_2CH_2O)_8H$ | | | 0 | | 1 | |
| 11 | $(C_{12}H_{25})_{2.11}\phi O(CH_2CH_2O)_{12}H$ | | | | | 1 | 3 |
| 12 | $(C_{12}H_{25})_{2.11}\phi O(CH_2CH_2O)_{14}H$ | | | | | 1 | 2 |
| 13c | $(C_{12}H_{25})_{2.11}\phi O(CH_2CH_2O)_{15}H$ | | | | | 1 | 1.5 |
| 14d | $(C_{12}H_{25})_{2.11}\phi O(CH_2CH_2O)_{12}H$ and lecithin | | | 0 | | | | a The alkyl group in tests 1–3 was a $C_8$ butene polymer.
b The alkyl groups in tests 4–7 were attached to the phenol nucleus by alkylating phenol with a distillation fraction of a propylene polymer having an average of 12 (tests 4, 5 and 6) or 15 (test 7) carbon atoms per molecule.
c The alkyl groups in tests 8–13 were propylene polymers. In tests 10–13 the average number of alkyl groups attached to each phenol molecule was 2.11.
d 100 p. p. m. of the ether and 30 p. p. m. of commercial soy lecithin having a lecithin content of 66% were added to the fuel in test 14.

IFD values in the range 0 to 3 correspond to those obtained with a very fresh fuel, that is, a fuel which has not been aged and in which gum formation and agglomeration has not yet progressed to an appreciable degree. Such a fuel may be employed in all of the usual burner systems and pass through any of the usual commercial fuel filters for an indefinitely long period without the accumulation of clogging deposits on the filter. Inspection of the data in Table I clearly shows the marked superiority of the polyoxyethylene ethers of polyalkyl phenols over polyoxyethylene ethers of monoalkyl phenols. Test 14 in the above table shows the effectiveness of a mixture of a polyoxyethylene ether of a polyalkyl phenol and a small amount of lecithin in preventing the accumulation of filter clogging deposits. The comparative efficiencies of the materials employed in tests 4 and 11 in the above table were corroborated by experiments in which large quantities of the test fuel were passed through to identical commercial filters. The passage of the fuel through the filters was continued until a large pressure drop was observed through the filter receiving the fuel of test 4. At this time the filter receiving the fuel of test 11 was found to be clear and clean.

A number of fuels containing the anti-filter clogging additives of this invention was subjected to an accelerated storage test in which the fuel mixtures were stored at 140° F. for a period of two weeks in vented bottles in the dark. The behavior of the fuel treated in this manner correlates well with the behavior of a fuel stored for a period of about four months under ordinary use conditions. IFD values below 10 for fuels which have been subjected to this accelerated storage test indicate that the fuel may be passed through commercial filters without clogging for longer periods than the more stable straight run gas oil containing no additive, and for considerably longer periods than the gas oils made from less stable crude sources and/or containing cracked gas oils.

TABLE II

| Test No. | Additive | Wt. Percent | Color, Gardiner | Filter Residue (p. p. m.) | | IFD Value |
|---|---|---|---|---|---|---|
| | | | | Suspended | Settled | |
| 1 | None | None | 13.5 | 3.4 | 8.5 | Off scale, 10 plus. |
| 2 | $(C_{12}H_{25})_{2.11}\phi O(CH_2CH_2O)_8H$ | 0.01 | 12 | 4.3 | 1.0 | 9. |
| 3 | $(C_{12}H_{25})_{2.11}\phi O(CH_2CH_2O)_{12}H$ | 0.01 | 12 | 5.2 | 1.6 | 8. |
| 4 | $(C_{12}H_{25})_{2.11}\phi O(CH_2CH_2O)_{16}H$ | 0.01 | 13 | 5.0 | 3.2 | 6. |
| 5 | $(C_{12}H_{25})_{2.11}\phi O(CH_2CH_2O)_{20}H$ | 0.01 | 13 | 6.8 | 3.0 | 4. |
| 6a | $(C_{12}H_{25})_{2.11}\phi O(CH_2CH_2O)_{12}H$+lecithin | 0.02 / 0.003 | 12.5 | 9.3 | 1.4 | 1.5. | a 0.02 weight percent of the ether and 0.003 weight percent of lecithin used as additive in test 6.

The effectiveness of various polyoxyalkylene ethers to prevent filter clogging due to the formation of ice and solid hydrates at low temperatures may be determined by a relatively simple test which correlates well with field tests and which is very much faster and cheaper than field tests. This test is conducted by passing the hydrocarbon fuel saturated with water and containing the additive to be tested through a cooling coil where the temperature is reduced to the desired level and then through a filter. The fuel is fed to the filter under a constant pressure head of 6 cm. of the fuel. The filter employed is a 10 micron filter paper carefully prepared to insure uniform resistance in the several papers employed to the flow of liquids. The effective filtration area of the filter is the same in each test. As a liquid which will ultimately clog the filter is passed through the filter under a constant pressure head, the rate of flow decreases with time. In order to compare filter clogging tendencies without continuing the flow until the liquid has completely ceased to ooze through the filter, an arbitrary definition of clogging is set up as follows: The filter is considered clogged when the time required for passage of 10 cc. of the fuel through the filter increases to ten times its value at the beginning of the test. Fuels are compared by comparing the total volume of fuel having passed through the filter when the tenfold time increase is observed (ten × point).

The following Table III summarizes the results of tests of a number of polyoxyalkylene ethers of alkyl phenols and of certain other materials upon the filter clogging tendency of a water-saturated fuel at low temperatures. The relative values of the several additives may be determined by comparing the numerical values tabulated in the last column of the table. In each case the additive was introduced into a water saturated jet engine fuel having the following inspections:

| | |
|---|---|
| API gravity | 46.5 |
| Reid vapor pressure | 5.1 |
| Gum, Spec. MIL-F-5616 | 21 mg./100 ml. |
| Freeze point | Below −76° F. |
| Aromatic content | 30% vol. |
| Bromine No. | 11 |

ASTM D-86 Distillation:

| | |
|---|---|
| Start | 104 |
| 5% | 139 |
| 10% | 173 |
| 20% | 231 |
| 50% | 310 |
| 70% | 341 |
| 80% | 367 |
| 90% | 455 |
| 95% | 510 |
| E. P. | 524 |

The data in the foregoing Table III are illustrative of the reduced tendency of the fuels of the invention to clog filters at low temperatures by depositing solidified water of solubility on the filters. Similar tests indicate that ethers having the following formulae are effective in reducing this filter clogging tendency:

$(C_8H_{17})\phi(CH_2CH_2O)_3H$, $(C_8H_{17})_2\phi(CH_2CH_2O)_6$ $(C_{10}H_{21})\phi(CH_2CH_2O)_5H$, $(C_{18}H_{37})\phi(CH_2CH_2O)_{10}H$ $(C_{14}H_{29})_2\phi(CH_2CH_2O)_{12}H$ $(C_{14}H_{29})_2\phi(CH_2CH_2CH_2O)_{16}H$ The effective ethers have at least one alkyl group containing at least 8 and up to 20 carbon atoms, and preferably from 1.5 to 3.0 alkyl groups each containing 12 to 18 carbon atoms in the alkyl phenol portion of the molecule. The polyoxyalkylene portion of the effective ether molecules is made up of from 2 to 40 and preferably from 8 to 20 alkylene oxide molecules. Ethylene oxide is the preferred alkylene oxide, but ethers formed from propylene oxide, butylene oxide and glycols are suitable components of the effective ethers. The number of alkylene oxide molecules is desirably adjusted to the total number of alkyl carbon atoms in the alkyl side chains of the phenol to produce a highly preferentially oil-soluble ether. To this end when propylene oxide, for example, rather than ethylene oxide is condensed with a particular alkyl phenol, the number of propylene oxide molecules is from 1.5 to 2 times the number of ethylene oxide molecules used, both numbers being within the above range of 2 to 40 alkylene oxide molecules.

As indicated by illustrative tests in the above tables, the polyoxyalkylene ether additives may desirably be em-

TABLE III

| Additive | Concentration | Temp., °F. | Fuel Through at 10× Point (cc.) |
|---|---|---|---|
| None | | 0 | 410 |
| None | | −20 | 212 |
| None | | −40 | 70 |
| None | | −60 | 90 |
| None | | −80 | 40 |
| $(C_{12}H_{25})_{2.1}\phi(CH_2CH_2O)_{12}H$ | 100 p. p. m. | 0 | [1] 785 |
| $(C_{12}H_{25})_{2.1}\phi(CH_2CH_2O)_{12}H$ | 100 p. p. m. | −20 | 405 |
| $(C_{12}H_{25})_{2.1}\phi(CH_2CH_2O)_{12}H$ | 100 p. p. m. | −40 | 157 |
| $(C_{12}H_{25})_{2.1}\phi(CH_2CH_2O)_{12}H$ + Methanol | 100 p. p. m. | | |
| Methanol | 0.1% vol. | 0 | 511 |
| $(C_{12}H_{25})_{2.1}\phi(CH_2CH_2O)_{12}H$ + Methanol | 0.1% vol. | −20 | 272 |
| $(C_{12}H_{25})_{2.1}\phi(CH_2CH_2O)_{12}H$ + Methanol | 0.1% vol. | −40 | 132 |
| Methanol | 0.1% vol. | 0 | 255 |
| Methanol | 0.1% vol. | −20 | 210 |
| Methanol | 0.1% vol. | −40 | 95 |
| $(C_{12}H_{25})_{2.1}\phi(CH_2CH_2O)_{12}H$ | 100 p. p. m. | | |
| Isopropanol | 0.1% vol. | 0 | [1] 765 |
| $(C_{12}H_{25})_{2.1}\phi(CH_2CH_2O)_{12}H$ + Isopropanol | 0.1% vol. | −20 | 532 |
| $(C_{12}H_{25})_{2.1}\phi(CH_2CH_2O)_{12}H$ + Isopropanol | 0.1% vol. | −40 | 529 |
| $(C_{12}H_{25})_{2.1}\phi(CH_2CH_2O)_{12}H$ + Isopropanol | 0.1% vol. | −60 | 228 |
| $(C_{12}H_{25})_{2.1}\phi(CH_2CH_2O)_{12}H$ + Isopropanol | 0.1% vol. | −80 | 95 |
| Isopropanol | 1% vol. | −40 | 60 |
| $(C_{12}H_{25})_{2.1}\phi(CH_2CH_2O)_{12}H$ | 100 p. p. m. | | |
| Butyl Carbitol | 0.1% vol. | −20 | 675 |
| $(C_{12}H_{25})_{2.1}\phi(CH_2CH_2O)_{12}H$ + Butyl Carbitol | 0.1% vol. | −40 | 420 |
| Butyl Carbitol | 0.5% vol. | −20 | 117 |
| $(C_{12}H_{25})_{2.1}\phi(CH_2CH_2O)_{12}H$ | 100 p. p. m. | | |
| 2-ethyl hexanol | 0.2% vol. | −40 | 127 |
| $(C_{12}H_{25})_{2.1}\phi(CH_2CH_2O)_{12}H$ | 100 p. p. m. | | |
| Lecithin | 20 p. p. m. | −20 | [1] 600 |
| $(C_{12}H_{25})_{2.1}\phi(CH_2CH_2O)_{12}H$ + Lecithin | 20 p. p. m. | −40 | 518 |
| $(C_{12}H_{25})_{2.1}\phi(CH_2CH_2O)_{12}H$ + Lecithin | 20 p. p. m. | −60 | 240 |
| $(C_{12}H_{25})_{2.1}\phi(CH_2CH_2O)_{12}H$ + Lecithin | 20 p. p. m. | −80 | 218 |
| $(C_{12}H_{25})_{2.1}\phi(CH_2CH_2O)_{12}H$ + Lecithin | {50 p. p. m. / 10 p. p. m.} | −40 | 83 |
| Lecithin | 100 p. p. m. | 0 | 170 |
| Lecithin | 100 p. p. m. | −20 | 195 |
| Lecithin | 100 p. p. m. | −40 | 73 |
| $(C_{12}H_{25})_{2.1}\phi(CH_2CH_2O)_{10}H$ | 100 p. p. m. | −40 | 85 |
| $(C_{14}H_{29})\phi(CH_2CH_2O)_6H$ | 100 p. p. m. | −40 | 85 |
| $(C_{14}H_{29})\phi(CH_2CH_2O)_6H$ | 100 p. p. m. | | |
| Isopropanol | 0.1% vol. | −40 | 100 |
| $(C_{12}H_{25})_{2.1}\phi(CH_2CH_2O)_{12}H$ [2] | 100 p. p. m. | 0 | 893 |
| $(C_{12}H_{25})_{2.1}\phi(CH_2CH_2O)_{12}H$ [2] | 100 p. p. m. | −40 | 175 |
| $(C_{12}H_{25})_{2.1}\phi(CH_2CH_2O)_{12}H$ | 100 p. p. m. | | |
| Lecithin | 20 p. p. m. | −60 | 275 |
| Isopropanol | 0.1% vol. | | |

[1] Fuel supply exhausted, no clogging.
[2] Kerosene extract of crude ether product used.

ployed in combination with one or more other materials. These supplemental materials fall into two groups: The phosphatides, as exemplified by lecithin derived from either vegetable or animal sources such as egg yolks or soybeans which is effective to reduce both filter clogging due to gum at ordinary temperatures, and water caused filter clogging at low temperatures, and organic compounds consisting of a short chain hydrophobic group, i. e., a hydrocarbon residue containing 1 to 6 carbon atoms combined with a hydrophilic group such as an ether oxygen group, a hydroxyl group, a sulfide, an amido group, or an ester group, the compounds being characterized by a hydrophobic-hydrophilic "balance" evidenced by appreciable solubility in both oil and water. This latter type of supplemental additive is introduced into fuels intended for low temperature use where water-induced filter clogging is the principal operational problem. Specifically, low molecular weight alcohols, especially isopropanol, are suitable; carbitols such as diethylene glycol, diethylene glycol monomethyl ether, and diethylene glycol monobutyl ether are suitable; the Cellosolves such as Cellosolve itself, butyl Cellosolve, benzyl Cellosolve, and methyl Cellosolve are suitable; low molecular weight esters, especially those of $C_1$–$C_6$ alcohols with $C_1$–$C_4$ aliphatic acids are suitable; low molecular weight sulfides such as methyl and ethyl sulfides may be employed and low molecular weight compounds containing an amido group are also suitable.

When the polyoxyalkylene ethers of alkyl phenols are employed, or they may be employed in combination with lecithin, the quantity of lecithin introduced does not exceed the amount of the ethers. It has been recognized that lecithin itself, derived from animal or vegetable sources such as egg yolk or soybean, has some value as a gum inhibitor. This characteristic of lecithin is described in U. S. Patent No. 1,884,899. If it is attempted to employ lecithin alone in amount sufficient to inhibit gum formation, for example, at concentrations of 0.01% to 0.02%, several adverse characteristics are observed. The lecithin used alone seems to be relatively less effective than the polyethers alone or in combination with lecithin when tested under actual field conditions in a wet fuel system, that is, a fuel system in which the fuel has accumulated water, for example, by breathing of humid air and subsequent condensation of moisture, in amount sufficient to form a distinct phase. Two further objections to the employment of lecithin alone lie in its property of forming a solid ash when burned, and its tendency to form deposits on hot surfaces out of solutions in oil, that is, surfaces at temperatures above about 180° F. which are sometimes encountered in fuel systems, particularly diesel engine systems. The presence of small amounts of lecithin in the fuel is also observed to cause significant increases in the Conradson carbon values of the fuel.

It has been found that small amounts of lecithin may be employed in combination with the polyoxyalkylene ethers of the present invention without encountering the disadvantages which attended the use of lecithin alone. When it is desired to employ small amounts of lecithin in combination with the polyoxyalkylene ethers of the present invention, the lecithin is always employed in amounts less than the amount of the ether, and preferably in amounts from 2 to 50% by weight based on the quantity of the ether employed.

When an organic compound composed of a hydrophobic group of 1 to 6 carbon atoms and a hydrophilic group such as ether oxygen, hydroxyl, and the like, described above, the amount of this material used is in the range 0.01 to 0.5% by volume based on the hydrocarbon fuel volume, and preferably in the range 0.05 to 0.2% by volume.

As indicated in Table III, both types of supplemental additive may be simultaneously employed in a jet engine fuel which may exhibit filter clogging tendencies attributable to both water and gum.

Very small amounts of the polyoxyalkylene ethers of the present invention, that is, 1% by weight or less, have been found entirely effective to prevent filter clogging. The amount employed is ordinarily in the range 0.001 to 0.20 weight percent of the total fuel, and preferably from .005 to .015 weight percent. In addition to preventing filter clogging, the employment of the additives of the polyoxyalkylene ethers of this invention and mixtures of polyoxyalkylene ethers with lesser amounts of lecithin are highly effective in preventing rust and fuels containing these additives in the amounts above described and hereafter claimed pass the ASTM D665–47T rust test.

This application is a continuation-in-part of our co-pending application, Serial No. 183,282, filed September 5, 1950.

We claim:

1. A normally liquid hydrocarbon fuel oil containing hydrocarbons boiling in the range of 350° to 750° F., having incorporated therein 0.001 to 0.20% by weight of a predominantly oil-soluble polyoxyethylene ether of an alkyl phenol, the alkyl portion of said alkyl phenol containing at least 8 carbon atoms and the polyoxyethylene portion of the molecule containing from 2 to 20 ethylene oxide groups.

2. A normally liquid hydrocarbon fuel oil containing hydrocarbons boiling in the range of 350° to 750° F., having incorporated therein 0.001 to 0.20% by weight of a predominantly oil-soluble polyoxyethylene ether of an alkyl phenol, the alkyl portion of said alkyl phenol containing 10 to 20 carbon atoms and the polyoxyethylene portion of the molecule containing from 2 to 20 ethylene oxide groups.

3. A normally liquid hydrocarbon fuel oil containing hydrocarbons boiling in the range of 350° to 750° F., having incorporated therein 0.001 to 0.20% by weight of a predominantly oil-soluble polyoxyethylene ether of an alkyl phenol, the alkyl portion of said alkyl phenol possessing an average of 1.5 to 3.0 alkyl groups, each containing 10 to 20 carbon atoms, and the polyoxyethylene portion of the molecule possessing from 8 to 20 ethylene oxide groups.

4. A normally liquid hydrocarbon fuel oil containing hydrocarbons boiling in the range of 350° to 750° F., having incorporated therein 0.001 to 0.20% by weight of a predominantly oil-soluble polyoxyethylene ether of an alkyl phenol, the alkyl portion of said alkyl phenol possessing an average of 1.8 to 2.2 alkyl groups, each containing 12 to 18 carbon atoms, and the polyoxyethylene portion of the molecule possessing from 10 to 15 ethylene oxide groups.

References Cited in the file of this patent

UNITED STATES PATENTS

| Number | Name | Date |
|---|---|---|
| 1,884,899 | Sollman | Oct. 25, 1932 |
| 2,072,120 | Mikeska et al. | Mar. 2, 1937 |
| 2,202,877 | Stevens et al. | June 4, 1940 |
| 2,213,477 | Steindorff et al. | Sept. 3, 1940 |
| 2,322,007 | Fischer | June 15, 1943 |
| 2,476,696 | Caplan | July 19, 1949 |
| 2,485,150 | Glavis | Oct. 18, 1949 |
| 2,485,376 | Glavis | Oct. 18, 1949 |
| 2,548,347 | Caron et al. | Apr. 10, 1951 |
| 2,563,101 | Colwell et al. | Aug. 7, 1951 |
| 2,579,692 | Neudeck | Dec. 25, 1951 |
| 2,599,338 | Lifson et al. | June 3, 1952 |

OTHER REFERENCES

Van Winkle, "Aviation Gasoline Manufacture," 1st edition, McGraw-Hill Book Co., Inc., New York (1944), pages 240, 241.